United States Patent Office 3,032,568
Patented May 1, 1962

3,032,568
PROCESS FOR THE PREPARATION OF 21-m-SULFO BENZOATES OF Δ$^{1,4}$-DEHYDROCORTICOSTEROIDS
André Allais and Pierre Girault, Paris, France, assignors by mesne assignments, to Roussel-UCLAF, S.A., Paris, France, a corporation of France
No Drawing. Original application Apr. 13, 1959, Ser. No. 805,674, now Patent No. 2,995,585, dated Aug. 8, 1961. Divided and this application Mar. 15, 1961, Ser. No. 95,832
5 Claims. (Cl. 260—397.45)

The present invention relates to new and valuable esters of steroid hormones and more particularly to m-sulfo benzoates of steroid hormones and to a process of making same.

In copending patent application Serial No. 760,575, filed September 12, 1958, there is described a process of preparing water soluble 21-o-sulfo benzoates of Δ$^{1,4}$-dehydrocorticosteroids and alkaline metals corresponding to Formula I.

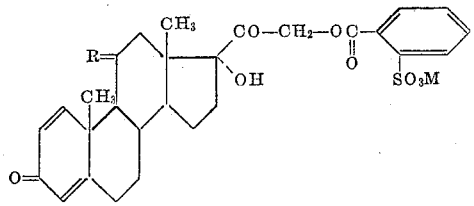

In said formula

R indicates the secondary hydroxy group

or the keto group=O and
M indicates an alkali metal.

Said water soluble alkali metal 21-o-sulfo benzoates of Δ$^{1,4}$-dehydrocorticosteroids are prepared by reacting, in a neutral solvent, a functional derivative of o-sulfo benzoic acid, such as its dichloride or its anhydride, in the presence of a tertiary base, with the Δ$^{1,4}$-corticosteroid compound. Thereby, the primary alcohol group in 21-position of the Δ$^{1,4}$-dehydrocorticosteroid compound is esterified by the carboxyl group of o-sulfo benzoic acid while, at the same time, the sulfonic acid group is converted into the sulfonate group. However, when attempting a similar reaction with a functional derivative of m-sulfo benzoic acid, it is not possible to arrive at the desired m-sulfo benzoate of Δ$^{1,4}$-dehydrocorticosteroids.

It is one object of the present invention to provide a simple and effective process of preparing alkali metal salts of 21-m-sulfo benzoates of Δ$^{1,4}$-dehydrocorticosteroid compounds.

Another object of the present invention is to provide the sodium salt of m-sulfo benzoate of Δ$^{1,4}$-pregnadiene-11β,17α,21-triol-3,20-dione of Formula II wherein M indicates sodium.

Other objects of the present invention and advantageous features thereof will become apparent as the description proceeds.

In principle the present invention consists in first preparing m-carboxy benzene sulfonyl chloride of the formula

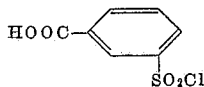

preferably by the action of chloro sulfonic acid on benzoic acid. Said m-carboxy benzene sulfonyl chloride acid is converted into its crystalline pyridine complex compound, the exact structure of which is not known. Said complex compound is then reacted in an inert solvent with the Δ$^{1,4}$-corticosteroid compound in the presence of a strong tertiary aliphatic amine such as triethylamine. As a result thereof the desired 21-m-sulfo benzoate is formed. It is quite surprising that this reaction takes place as the same pyridine complex compound, when reacted in the presence of pyridine, does not yield the desired object. After esterification is completed, the solvent and the bases are driven off by distillation. The reaction mixture is treated with an aqueous sodium, potassium, or lithium hydroxide solution, thereby producing a solution of the desired sodium, potassium, or lithium salt of the m-sulfo benzoate of Formula II.

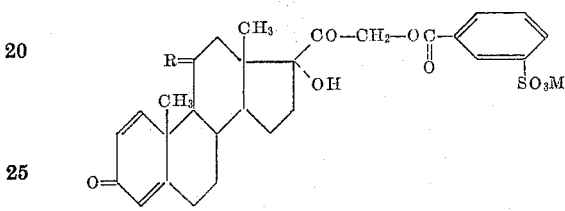

In said Formula II

R indicates the secondary alcohol group

or the keto group=O, while
M indicates an alkali metal.

The resulting salt is readily salted out by the addition of an alkali metal salt, the alkali metal component of which corresponds to that previously used, for instance, by the addition of the acetates of sodium, potassium or lithium. Thereafter the m-sulfo benzoate of Formula II is purified by recrystallization. It is, of course, also possible, without deviating from the scope of the present invention, to dilute the reaction mixture with an inert water insoluble solvent, which either corresponds or does not correspond to that in which esterification was effected, and to transfer the desired salt into the aqueous phase by washing with an aqueous solution of the hydroxides of sodium, potassium, or lithium. After separation of the two phases, the aqueous phase is salted out and the resulting salt is purified by crystallization.

The resulting alkali metal salts of the m-sulfo benzoates of Δ$^{1,4}$-corticosteroid compounds are readily soluble in water and, thus, permit to use these hormones in the form of their aqueous solutions. The sulfo benzoyl radical renders the compounds sufficiently water soluble and also imparts to them highly advantageous antiseptic properties in pharmaceutical compositions, such as, for example, in collyria. In contrast to the o-sulfo benzoates described in the above-mentioned copending patent application Serial No. 760,575, the new m-sulfo benzoates according to the present invention are more readily saponifiable in the organism as hydrolysis in an aqueous medium proceeds more rapidly.

The following example serves to illustrate the present invention, without, however, limiting the same thereto. More particularly, other strong aliphatic tertiary bases, such as tributylamine, may be used instead of triethylamine, and other solvents than those employed in the example may be used. The reaction temperature and duration may be varied without departing from the scope

EXAMPLE I

*Preparation of the Sodium Salt of the 21-m-Sulfo Benzoate of $\Delta^{1,4}$-Pregnadiene-11β,17α,21-Triol-3,20-Dione of Formula II*

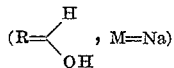

(a) PREPARATION OF m-CARBOXY BENZENE SULFONYL CHLORIDE 225 g. of pure benzoic acid are introduced with stirring into 600 g. of chloro sulfonic acid. The temperature rises spontaneously to 40° C. The reaction mixture is heated for one hour at 130–140° C., then cooled to room temperature, and poured on ice. m-Carboxy benzene sulfonyl chloride precipitates. It is filtered off, washed by forming a paste with water, dried in a vacuum, and recrystallized from benzene. After drying, 250 g. of m-carboxy benzene sulfonyl chloride are obtained; melting point: 136–137° C. The said chloride contains 16.0% of chlorine (the theoretical chlorine content is 16.1%). The identical to the compound described by Delaby, "Bull. Soc. Chim. France," 1945, vol. 12, page 954.

(b) PREPARATION OF THE PYRIDINE COMPLEX COMPOUND OF m-CARBOXY BENZENE SULFONYL CHLORIDE 12 g. of the sulfonyl chloride prepared as described above under (a) are introduced into 80 cc. of pyridine while stirring and operating in a nitrogen atmosphere. Dissolution takes place while the temperature rises to 35° C. The solution is then heated at 70° C. for 15 minutes while continuing stirring. The complex compound starts to crystallize after heating for 10 minutes. The mixture is then cooled to room temperature and stirring is continued for one hour. The resulting crystalline complex compound is filtered and washed by forming a paste with anhydrous chloroform. After drying, 12 g. of the complex compound which melts at 125° C. are obtained. Analysis shows a content of 1.0% of chlorine and 5% of nitrogen.

(c) CONDENSATION OF THE PYRIDINE COMPLEX COMPOUND WITH $\Delta^{1,4}$-PREGNADIENE-11β,17α,21-TRIOL-3,20-DIONE, OF FORMULA II

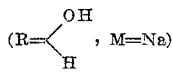

6 g. of the pyridine complex compound of m-carboxy benzene sulfonyl chloride prepared according to (b) and 40 cc. of anhydrous chloroform are added to 4 g. of $\Delta^{1,4}$-pregnadiene-11β,17α,21-triol-3,20-dione. 5 cc. of anhydrous triethylamine are then introduced while passing nitrogen through the mixture and mechanically stirring the same. The temperature rises to 30° C. and the mixture is refluxed for one hour. The resulting orange colored solution is cooled to room temperature, evaporated to dryness in a vacuum, and the residue is taken up with 100 cc. of water. 34 cc. of N sodium hydroxide solution are added to the aqueous solution and then 2 cc. of acetic acid and 100 cc. of a saturated aqueous solution of sodium acetate are admixed thereto. The desired sodium m-sulfo benzoate of Formula II is precipitated in a gummy state. It is separated by decanting, redissolved in 50 cc. of water, and again precipitated by pouring the aqueous solution into 100 cc. of a saturated aqueous solution of sodium acetate. The precipitate is triturated, filtered, washed by forming a paste with a saturated solution of sodium acetate, and then dried. Thus 6 g. of the crude sodium salt of the m-sulfo benzoate of $\Delta^{1,4}$-pregnadiene-11β,17α,21-triol-3,20-dione of Formula II,

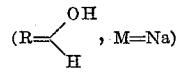

are obtained which is purified by recrystallization from 3 volumes of water. After standing overnight in a refrigerator, the precipitated crystals are filtered and washed with a minimum of ice water and then by forming a paste with a little acetone. After drying, 3.35 g. of the pure salt are obtained in the form of crystalline needles. The yield is 53.4% calculated for the starting hormone. This compounds melts at 293–295° C. (with decomposition); optical rotation $[\alpha]_D^{20} = +170° \pm 1.5°$ (concentration: 1% in water). It is slightly hygroscopic, insoluble in acetone, benzene, chloroform, and ether, slightly soluble in alcohol, readily soluble in warm water, and to about 2% soluble in cold water. A 1% aqueous solution shows a pH of 6.26 and is completely hydrolyzed within 4 hours.

*Analysis.* — $C_{28}H_{31}O_9SNa$; molecular weight=566.6. Calculated: C, 59.35%; H, 5.51%; S, 5.66%; Na, 4.06%. Found: C, 59.5%; H, 5.5%; S, 5.7%; Na, 3.8%.

This product has not been previously described in the literature.

On proceeding as described in this example and using $\Delta^1$-dehydrocortisone as corticosteroid compound, the sodium salt of the 21-m-sulfo benzoate of $\Delta^1$-dehydrocortisone is prepared.

The present application is a divisional application of application Serial No. 805,674, filed April 13, 1959, now Patent No. 2,995,585.

In place of triethylamine used as strong tertiary aliphatic amine in Example I or of tri-n-butylamine mentioned hereinabove, there may be used other tertiary lower alkylamines.

In place of $\Delta^1$-dehydrocortisol and $\Delta^1$-dehydrocortisone used in Example I, there may be employed the corresponding 9-fluoro-derivatives or, respectively, 6-methyl or 16-methyl substitution products or the like $\Delta^{1,4}$-dehydrocorticosteroid compounds.

We claim:

1. A process for the preparation of the alkali metal salts of 21-m-sulfo benzoate of $\Delta^{1,4}$-pregnadienes which comprises reacting m-carboxy benzene sulfonyl halide with pyridine to form the pyridine complex thereof, reacting said complex with a $\Delta^{1,4}$-pregnadiene in the presence of a tertiary amine, reacting the resulting product with an alkali metal hydroxide to form the alkali metal salt of the 21-m-sulfo benzoate of the $\Delta^{1,4}$-pregnadiene and recovering said salts.

2. A process for the production of alkali metal salts of the 21-m-sulfo benzoate of $\Delta^{1,4}$-pregnadienes having the formula:

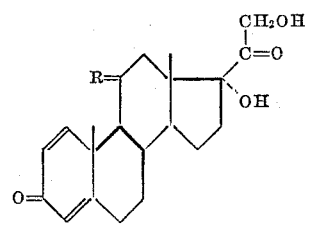

wherein R is selected from the group consisting of =O and

which comprises reacting m-carboxy benzene sulfonyl halide with pyridine to form the pyridine complex of m-carboxy benzene sulfonyl halide, reacting said complex with a $\Delta^{1,4}$-pregnadiene of the above formula in the presence of a tertiary amine, reacting the resulting product with an alkali metal hydroxide to form the alkali metal salt of the 21-m-sulfo benzoate of the $\Delta^{1,4}$-pregnadiene and recovering said salt.

3. The process of claim 2 wherein the alkali metal salt is the sodium salt.

4. The process of claim 2 wherein the $\Delta^{1,4}$-pregnadiene is $\Delta^{1,4}$-pregnadiene-11$\beta$,17$\alpha$,21-triol-3,20-dione.

5. The process of claim 2 wherein the tertiary amine is triethylamine.

References Cited in the file of this patent

UNITED STATES PATENTS

| | | |
|---|---|---|
| 2,837,464 | Nobile | June 3, 1958 |
| 2,894,963 | Gould et al. | July 14, 1959 |
| 2,908,696 | Nussbaum et al. | Oct. 13, 1959 |